INVENTORS
EUGENIO ALLARIA
LUIGI GUZZI
BY
Ostrolenk, Faber, Gerb & Soffen
ATTORNEYS

United States Patent Office 3,621,507
Patented Nov. 23, 1971

3,621,507
DEVICE FOR ATTACHING THE WIPER TO THE WIPER ARM OF A WINDSHIELD WIPER
Eugenio Allaria and Luigi Guzzi, Milan, Italy, assignors to Fabbrica Italiana Magneti Marelli S.p.A., Milan, Italy
Filed Sept. 30, 1969, Ser. No. 862,350
Claims priority, application Italy, Oct. 10, 1968, 22,268/68
Int. Cl. B60s 1/40
U.S. Cl. 15—250.32
3 Claims

ABSTRACT OF THE DISCLOSURE

Easy and rapid connection of a wiper to a windshield wiper arm is accomplished with an elastically deformable structure secured to the bridge piece of the wiper blade in oscillating fashion by means of a pin, and having an inner opening to receive the end of the wiper arm and to hold it disengageably with cooperating parts held together by the elastic pressure exerted by the deformable structure.

---

The present invention relates to the connection of the wiper to the wiper arm of a windshield wiper.

The known connections employ for the connecting of the wiper to the wiper arm metal parts with or without interposition of plastic parts and with an elastic member consisting of a metal band spring, duly shaped and embedded in the movable part of the connection and surrounding the pivot pin of the wiper on the curved end of the wiper arm.

It follows that such devices require a number of parts and therefore laborious assembly operations.

The object of the present invention is to provide a new connection for the disengageable connecting of such parts which has a reduced number of parts and makes it possible to obtain an easy and rapid connection of the wiper to the wiper arm, a reliable connection so as to avoid accidental disengagement, silent swinging and an easy disengagement when desired by the operator.

The connection which forms the object of the present invention is characterized by the fact that it comprises an elastically deformable structure secured to the bridge piece of the wiper blade in oscillating fashion by means of a pin and having an inner opening to receive the end of the wiper arm and hold it disengageably with the aid of cooperating engagement parts which are held together by the elastic pressure exercised by said structure.

In accordance with a preferred embodiment, the structure comprises two parts connected in such a manner as to produce the said inner space and held to each other and to the bridge piece by the pin. At least one of the parts has a curved surface which at rest reduces the free passage of the opening while it yields during the introduction into the space of the end of the wiper blade by exerting a pressure on said end.

The invention will now be illustrated, solely by way of example and without limitation, with reference to the embodiment shown in the accompanying drawing in which.

Figure 1:
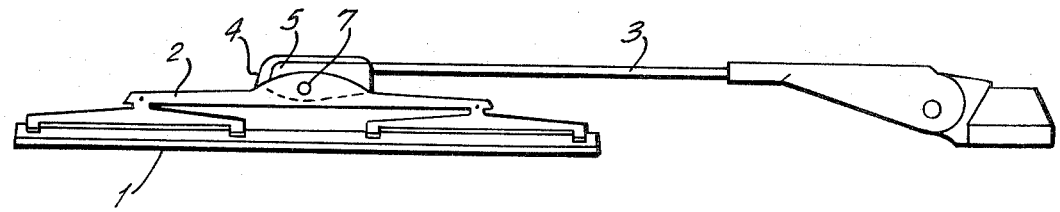
FIG. 1 is a side view of a windshield wiper blade connected to the wiper arm by means of the attachment in accordance with the invention.
Figure 2:
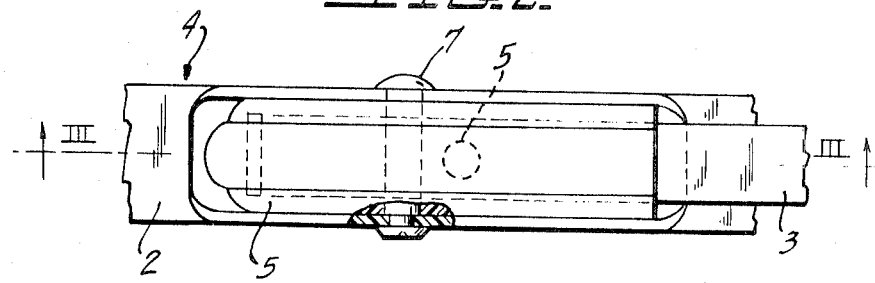
FIG. 2 is a plan view on a larger scale of the attachment of FIG. 1.

The wiper blade, which in FIG. 1 is of the type adapted to clean curved windshields, comprise two main elements, the wiper blade proper 1 and the supporting bridge piece 2 connected to the end of the arm 3 by a so-called bayonet joint 4.

Figure 3:
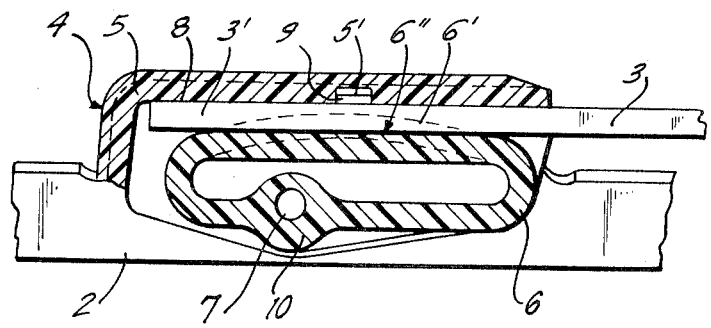
FIG. 3 is a cross-section through the attachment of FIG. 2 along the line III—III.
Figure 4:
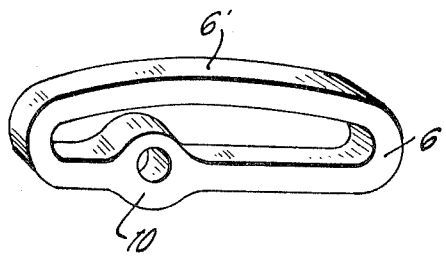
FIG. 4 shows in perspective a component part of the attachment.

In accordance with the invention this joint is formed, as can be noted in particular from FIG. 3, of an outer housing 5 of plastic material selected from among those which are strongest and quietest, of an inner support 6 also of plastic, and of a pin 7 which acts as pivot for said support and as oscillating connection of the parts 2, 5 and 6, which are otherwise independent. The housing 5 is mounted on top of the support 6 but spaced from it on the inside so as to form the opening or seat 8 intended to receive the end 3' of the arm 3.

The two parts 5 and 6 form a single unit which is free to oscillate around the said pin 7, said parts being also free from each other. The end 3' of the arm 3 consists of a flat stem provided with a tooth 9 which fits in the recess 5' of the housing 5.

The support 6 consists of a ring-shaped bolck which thus has a recess on the inside and has a surface 6' which, in the position of rest, is curved extending into the space 8, while under operating conditions it assumes a flat or less curved shape 6", namely when the end 3' of the arm 3 is inserted in the opening 8.

During the inserting of the arm 3, the end 3' causes a yielding of 6', while the tooth 9 deforms the said upper surface 6' to a greater extent until the said surface is in position corresponding to the recess 5'.

The pin 7 is inserted in the sides of the bridge piece 2, in the sides of the outer housing 5 and in the hub 10 of the support 6. It is preferable that the pin 7 be riveted on one of the sides of the bridge piece 2.

The inner support 6, in view of the behavior of the surface 6', must be of elastically deformable material. In order to obtain silent operation and a long life, the support is also selected from among the strongest noise-damping materials.

The position of the pin 7 is shifted with respect to the center line of the support 6 and of the hub 10 so as to facilitate the insertion of the end 3' into the opening 8 and permit further deformation to compensate for the protrusion of the tooth 9 before the latter is seated in the opening 5'.

In order to remove the wiper arm from the opening 8, it is sufficient to press said arm at the place of the support 6 and then pull it outward.

Naturally variants and modifications of the embodiment shown are possible without thereby going beyond the scope of the invention.

Thus, for instance, the curved elastic inner surface may be provided in the housing instead of on the support, or on both parts.

It is clear in any event that such surface must exercise its thrust in the direction of the tooth 9 in order to promote the insertion thereof into the seat 5' and hold it in place.

It is also clear that the tooth 9 and the recess 5' may be borne by the elastic structure and the end 3' respectively. The shape of said members may also be different from that shown, since it is essential that by the engagement of them there is obtained a disconnectable engagement which is subjected to the elastic action of the support and/or the housing.

Other embodiments also falling within the invention may, for instance, be provided by an open shape of the member 6, provided that it is provided at 7, rather than the shape of a closed ring; the part 6 may have on its surface 6' in suitable position a protruding, cylindrical or inclined nose; the pivot pin 7 may be made of upsettable metal or of other material even nonmetallic and fastened by detent, etc.

The embodiments of the invention in which an exclusive privilege or property is claimed are defined as follows:

1. Disengageable device for connecting the wiper proper to the wiper arm of a windshield wiper for vehicles, characterized by a structure of elastically deformable material held in oscillating manner to the bridge piece of the wiper blade by means of a pin and having an inner elongated pasage to receive the free end of the wiper arm and hold it, with the aid of cooperating engaging parts held detachably together by the elastic pressure exercised by said structure; said structure including a support and a housing located above it which form the inner passage and are connected together and to the bridge piece by means of the pin, each made of molded plastic material; the support and/or the housing having a yieldable inner wall which acts elastically on the free end of the wiper arm when inserted in the passage through its entrance end to assure the holding fast thereof; said free end of said arm having at least one engagement element for coupling with a corresponding element of the support and/or of the housing; said element being subjected directly to the elastic action of the elastic wall of the support and/or of the housing; said corresponding element being positioned closer than said pin to said entrance, said elastic action also being exerted directly on portions of said wiper arm position more remote than said pin from said entrance.

2. Device according to claim 1, characterized by the fact that the support consists of a ring-shaped body having said yieldable wall which, before insertion of the end of the wiper arm, is convex and extends freely into the passage to constrict same, said support furthermore having on the opposite side a hole aligned with the side holes of the housing and of the blade bridge piece to receive the pivot and fastening pin.

3. Device according to claim 2, characterized by the fact that the hole of the support and therefore the pivot pin is located eccentrically with respect to the transverse center line of the support.

References Cited

UNITED STATES PATENTS

| | | | |
|---|---|---|---|
| 3,023,446 | 3/1962 | Prohaska | 15—250.32 |
| 3,082,463 | 3/1963 | Bock | 15—250.32 |
| 3,254,358 | 6/1966 | Wise | 15—250.32 |

ROBERT W. JENKINS, Primary Examiner